United States Patent [19]

Sasayama et al.

[11] 4,348,729
[45] Sep. 7, 1982

[54] ENGINE CONTROL SYSTEM INCLUDING NON-VOLATILE MEMORY AND CORRECTION DATA TRANSFER METHOD

[75] Inventors: Takao Sasayama, Hitachi; Seiji Suda, Mito, both of Japan

[73] Assignee: Hitachi, Ltd., Tokyo, Japan

[21] Appl. No.: 139,550

[22] Filed: Apr. 11, 1980

[30] Foreign Application Priority Data

Apr. 13, 1979 [JP] Japan .................................. 54-44392

[51] Int. Cl.³ ........................ G06F 15/20; G11C 7/00; G11C 9/00
[52] U.S. Cl. ............................. 364/431.12; 123/486; 364/900; 365/228
[58] Field of Search ............... 364/424, 425, 200, 900; 365/228, 229

[56] References Cited

U.S. PATENT DOCUMENTS

| | | | |
|---|---|---|---|
| 3,676,717 | 7/1972 | Lockwood | 365/228 |
| 4,031,363 | 6/1977 | Freeman et al. | 364/425 |
| 4,064,492 | 12/1977 | Schuermeyer et al. | 365/228 |
| 4,130,095 | 12/1978 | Bowler et al. | |
| 4,188,668 | 2/1980 | Finlay | 364/900 |
| 4,201,161 | 5/1980 | Sasayama et al. | 364/431 |
| 4,234,920 | 11/1980 | Van Ness et al. | 364/200 |

Primary Examiner—Felix D. Gruber
Attorney, Agent, or Firm—Craig and Antonelli

[57] ABSTRACT

A method and a system for engine control are disclosed. Electrical signals representing the engine operating conditions are detected, which electrical signals, together with the control data stored in a memory, are used to calculate a correction factor for correcting the control data for controlling the engine, where the correction factor is stored in a volatile memory, thus controlling the engine on the basis of the control data corrected by the correction factor. The correction factor stored in RAM is transferred to a non-volatile memory under predetermined conditions. Even if the voltage applied to RAM is reduced to a level lower than the storage ability of RAM, resulting in the loss of the stored data, the correction factor stored in EAROM is transferred back to RAM upon restoration of a normal voltage at RAM.

35 Claims, 11 Drawing Figures

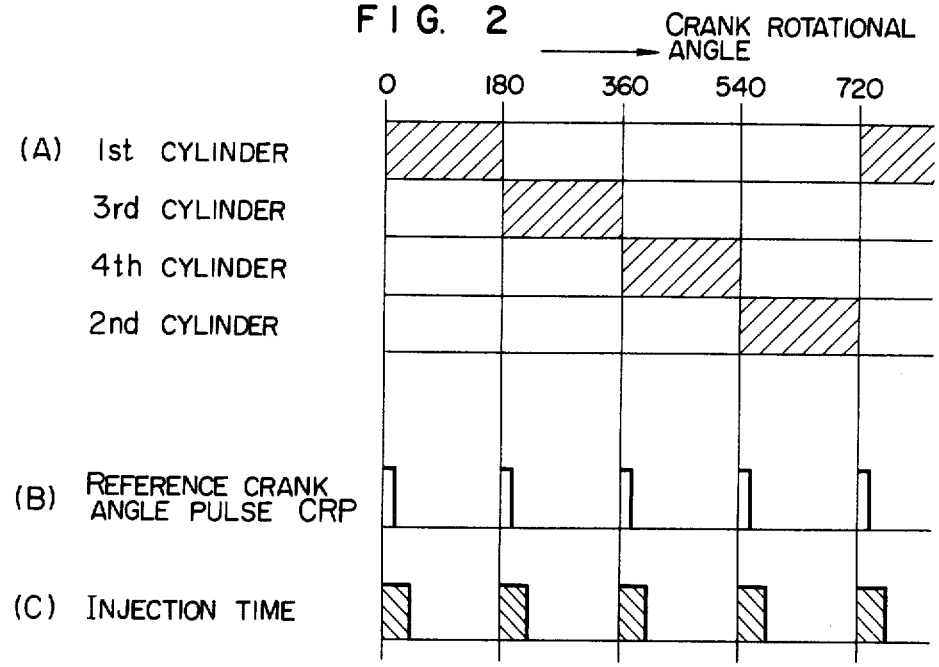
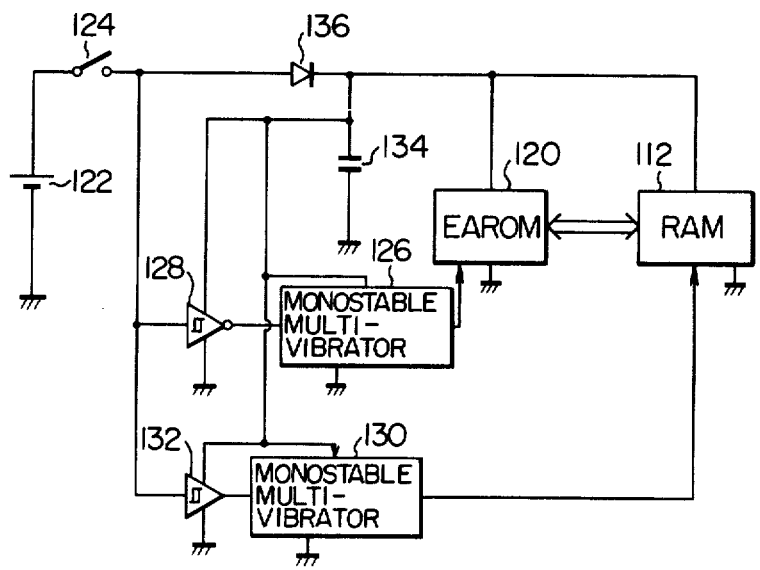

ENGINE CONTROL SYSTEM INCLUDING NON-VOLATILE MEMORY AND CORRECTION DATA TRANSFER METHOD

FIELD OF THE INVENTION

The present invention relates to a method and a system for engine control, or more in particular to an engine control system comprising a non-volatile memory in which control data which should not be erased for the purpose of engine control is stored and is capable of being updated.

BACKGROUND OF THE INVENTION

In an engine control system operated by closed control loop, an indispensable component is an exhaust gas sensor which detects a stoichiometric air-fuel ratio. This exhaust gas sensor is mounted at the exhaust side of the engine and, therefore, a time delay occurs in controlling the intake mixture gas. Further, when the engine temperature is low, such as during engine warm-up, the exhaust gas sensor fails to operate or operates insufficiently and, therefore, control by this sensor is impossible. The only method conceivable for accurate engine control to attain a predetermined air-fuel ratio under such a condition is by controlling the fuel injection amount at an improved detection accuracy of the air flowmeter.

In view of the above-mentioned fact that closed loop control of the engine by the exhaust gas sensor is impossible under such a special engine operating condition, the prior art control systems employ a method in which an appropriate air-fuel ratio is read out of a table stored in a read-only memory (ROM) in accordance with the intake air flow rate and engine number of revolutions (engine speed), and the air-fuel ratio thus read out is used for engine control. In such a conventional method for engine control, however, an inaccurate air-fuel ratio is likely to be read out of the memory due to variations in the characteristics of the air flowmeter or changes in the detection sensitivity thereof with time. A method for overcoming this problem is disclosed by U.S. Pat. No. 4,130,095 and U.S. Pat. Application Ser. No. 950,572 dated Oct. 12, 1978, now Pat. No. 4,201,161 in which a correction factor for correcting the air-fuel ratio stored in the table is tabulated and stored in a random access memory (RAM) and this correction factor is appropriately rewritten during the process of closed loop control based on the exhaust gas sensor.

However, a RAM, in spite of capability of writing and reading the data, or the erasure thereof, has the disadvantage that the data stored therein disappears at the time of power off or failure. This type of engine control data is used recurrently for driving the engine and therefore must be kept unerased. For this reason, a method is conceivable in which an EAROM is used instead of a RAM to prevent the required data from being erased even when power is cut off. By the way, EAROM is an abbreviation of an electrically alterable ROM which makes up a non-volatile memory.

Although this EAROM is available for repeated write and read operations and has an excellent feature that the storage therein is not erased at the time of power cut-off, its disadvantage is that the reliability thereof is reduced after repeated operations.

SUMMARY OF THE INVENTION

Accordingly, it is an object of the present invention to provide a reliable method and system for engine control in which data required for engine control are maintained all the time.

According to the present invention, there is provided an engine control system comprising two memories including a volatile memory capable of being written into and readout, and a non-volatile memory capable of being written into and readout. Normally, the engine is controlled on the basis of the engine control data stored in the volatile memory, which data is capable of being updated appropriately to provide an accurate control of the engine all the time. The data stored in the non-volatile memory is updated appropriately on the basis of the latest data stored in the volatile memory.

BRIEF DESCRIPTION OF THE DRAWINGS

The above and other objects, features and advantages will be apparent from the following detailed description taken in conjunction with the accompanying drawings, in which:

FIG. 2 is a time chart for explaining the engine operating timing;

FIG. 4 is a block diagram showing a configuration for transferring the control data from RAM to EAROM when the source voltage drops below a predetermined level;

DETAILED DESCRIPTION

Figure 1:
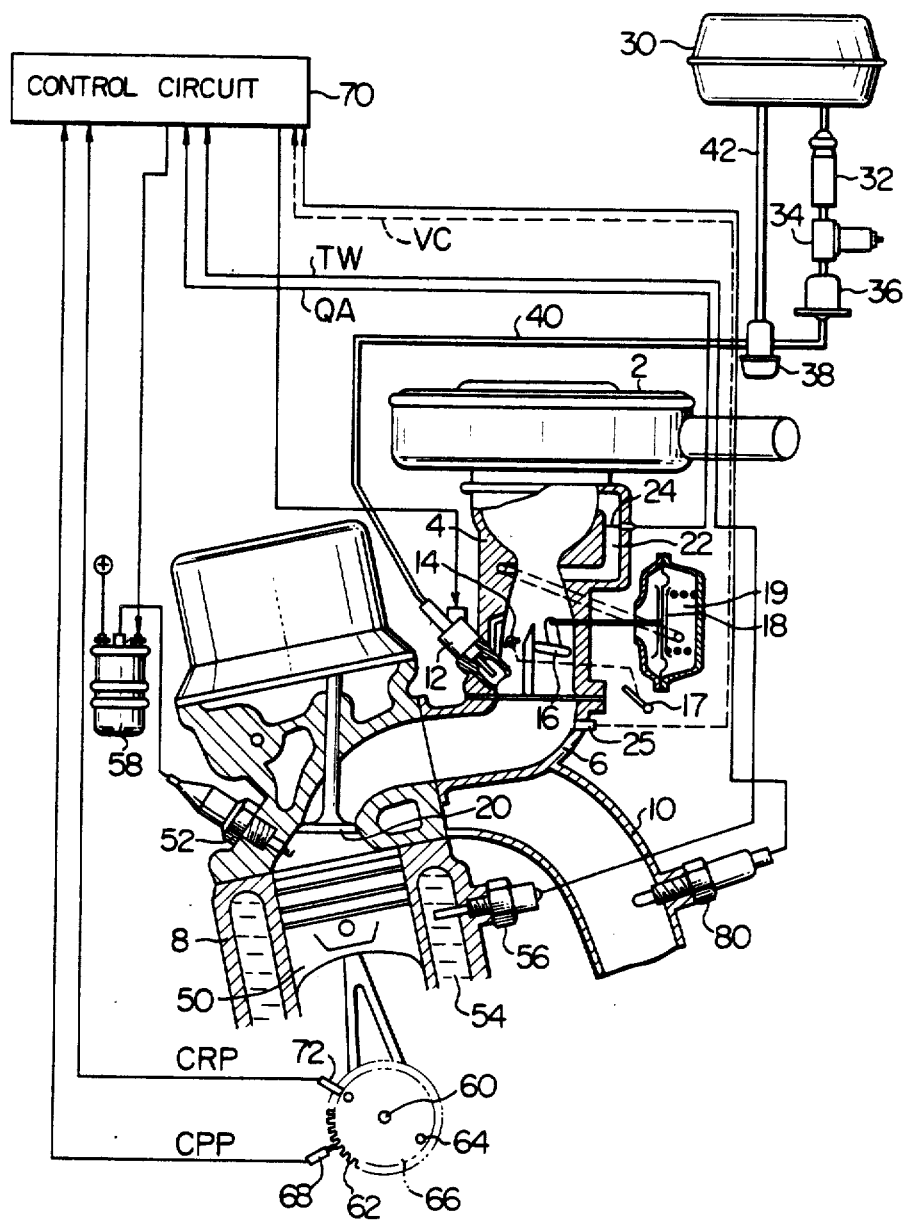
FIG. 1 is a diagram for explaining the overall engine system.

The present invention will be explained below in detail with reference to the embodiments shown in the drawings.

A control system for the overall engine is shown in FIG. 1. In this drawing, intake air is supplied to a cylinder 8 through an air cleaner 2, a throttle chamber 4 and an intake manifold 6. The gas ignited in the cylinder 8 is discharged into the atmosphere via an exhaust tube 10 from the cylinder 8.

The throttle chamber 4 is provided with an injector 12 for injecting the fuel. The fuel injected from this injector 12 is atomized in the air passage of the throttle chamber 4, and forms a mixture gas with the intake air. This mixture gas is supplied through the intake manifold 6 to the combustion chamber of the cylinder 8 as the intake valve 20 opens.

Throttle valves 14 and 16 are provided near the outlet of the injector 12. The primary throttle valve 14 is mechanically interlocked with an accelerator pedal 17 and operated by the driver. The secondary throttle valve 16, on the other hand, is provided in such a position as to be driven by the difference in pressure between the atmosphere and the chamber 19 communicating with the negative pressure section. This secondary throttle valve 16 is closed in the range of a small amount of air flow rate, and with the increase in air flow rate, begins to be opened by the increase in the negative pressure exerted on the diaphragm 18, thus reducing the resistance of the intake air.

An air path 22 is provided upsteam of the throttle valves 14 and 16 in the throttle chamber 4. An electrical heating element 24 constituting an air flow rate detector is arranged in this air path 22, to thereby produce an electrical signal which is determined from the relation between the air flow velocity and the amount of heat transmission of the heating element 24, which electrical signal thus changes with the air flow velocity. The heating element 24, which is arranged in the air path 22, is protected from both the high-temperature gas generated by a back fire of the cylinder 8 and from contamination by dust or the like contained in the intake air. The outlet of this air path 22 is open to a position near the narrowest part of the venturi, while the inlet thereof is open to the upstream side of the venturi. The heating element 24 may be replaced by a negative pressure sensor with equal effect.

The fuel supplied to the injector 12 is supplied to a combustion pressure regulator 38 from a fuel tank 30 through a fuel pump 32, a fuel damper 34 and a filter 36. On the other hand, pressurized fuel is supplied to the injector 12 from the combustion pressure regulator 38 via a pipe 40. The fuel is adapted to be returned to the fuel tank 30 from the combustion pressure regulator 38 through the return pipe 42 so that the difference between the pressure in the intake manifold 6 into which the fuel is injected from the injector 12 and the pressure of the fuel supplied to the injector 12 is maintained constant. The reason for which the differential pressure is maintained constant by the fuel regulator 38 is in order to make possible the control of the amount of injection merely by controlling the valve opening time of the injector 12.

The mixture gas introduced from the intake valve 20 is compressed by a piston 50 and is burned by a spark generated from a spark plug 52, so that this combustion is converted into kinetic energy. The cylinder 8 is cooled by cooling water 54, the temperature of which is measured by a water temperature sensor 56, and the resulting measurement is used as the engine temperature. The spark plug 52 is supplied with a high voltage from the ignition coil 58 at ignition timing.

The crankshaft 60 securely carries a rotary member 66 of magnetic material having teeth 62 at intervals of, say, 0.5 degrees and two protrusions 64 on one side thereof at intervals of, say, 180 degrees in case of a four-cylinder engine. A crank position sensor 68 is arranged in opposed relation with the teeth 62 and generates a position pulse CPP for each 0.5-degree rotation of the crank shaft, which position pulse is supplied to a control circuit 70 including a micro-computer. The crank angle sensor 72 is arranged in opposed relation with the protrusions 64 and generates a reference crank angle pulse CRP for each 180-degree rotation of the crank shaft, which pulse CRP is supplied to the control circuit 70. The output TW of the water temperature sensor 56 and the electrical signal QA associated with the air flow rate which is produced from the heating member 24 are also applied to the control circuit 70. In response to these signals applied thereto, the control circuit 70 produces a control signal, whereby the injector 12 and the ignition coil 58 are driven.

The gas ignited in the cylinder 8 is discharged into the atmosphere from a discharge valve (not shown) through the exhaust tube 10. This discharge tube 10 includes a λ sensor 80 for detecting the oxygen gas in the exhaust gas and an exhaust gas temperature sensor (not shown). The output of the λ sensor 80 is applied also to the control circuit 70.

The operation of the engine described above will be explained with reference to FIG. 2 showing the timing of fuel injection from the injector of a four-cylinder engine. The abscissa represents the rotational angle of the crank shaft of the engine. In FIG. 2(A), the intake stroke is shown in shadowed form. As seen from the drawing, the intake stroke occurs at intervals of 180 degrees of the crank angle, so that the intake stroke is effected in the first cylinder in the range from 0 to 180 degrees, in the third cylinder in the range from 180 to 360 degrees, in the fourth cylinder in the range from 360 to 540 degrees, and in the second cylinder in the range from 540 to 720 degrees.

As shown in FIG. 2(B), a reference crank angle pulse CRP is produced at intervals of 180 degrees of crank angle. In response to this pulse, the injector valve is opened and the valve opening time of the injector 12 is determined from the result of a calculation made at the control circuit 70 on the basis of the data already obtained. The fuel injection time which represents the valve opening time of the injector 12 is shown in FIG. 2(C).

Figure 3:
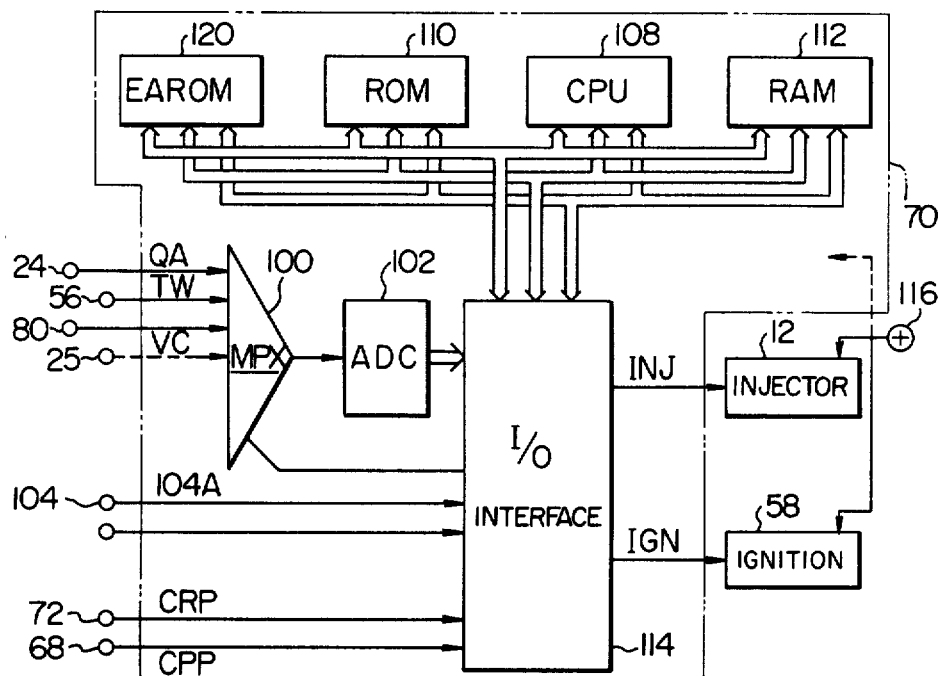
FIG. 3 is a block diagram showing a configuration of the overall engine control system.

Next, the control circuit 70 will be described with reference to FIG. 3 showing a specific block of the control circuit. In the drawing, input signals are roughly divided into three types. A first group includes the output QA of the heating member 24 for detecting the intake air flow rate, the output TW of the sensor 56 for detecting the temperature of the engine cooling water and other analog input signals. These analog input signals are applied to a multiplexer (or MPX) 100, in which the outputs of the sensors are selected by time devision and applied to an analog-digital converter 102 for conversion into a digital value. Secondly, an on-off signal is applied, such as a signal 104A supplied from the switch 104 operatively interlocked with the throttle valve 14. This switch 104, which is kept normally on, is turned off by depressing the acceleration pedal, thus producing a signal 104A. This signal may be handled as a 1-bit digital signal.

A third type of input signals includes a pulse train such as a reference crank angle pulse CRP and a position pulse signal CPP supplied form the crank angle sensor 72 and the crank position sensor 68 respectively. In the case of a four-cylinder engine, the crank angle pulse is generated at intervals of 180 degrees of crank angle; at intervals of 120 degrees in the case of a six-cylinder engine; and at intervals of 90 degrees in the case of an eight-cylinder engine. The position pulse, on the other hand, is produced at intervals of, say, 0.5 degrees of crank angle.

Numeral 108 shows a central processing unit for digital calculation, and numeral 110 shows a ROM which is a memory for storing a control program and fixed data.

Numeral 112 is a RAM which is a memory unit from and into which data may be read and written respectively. An input-output interface circuit 114 supplies a signal to CPU 108 in response to the signals from the A-D converter 102, the switch 104 and the sensors 68 and 72. Also, the injection signal INJ and the ignition signal IGN from CPU 108 are supplied to the injector 12 and the ignition coil 58. By the way, the voltages applied from the power terminal 116 to the circuits and elements making up the control circuit 70 are not shown in the drawing. Further, the injector 12 and the ignition coil 58 include respectively a solenoid for driving the valve and a primary coil for storing the electromagnetic energy. One end of each of these coils is connected to the power terminal 116, and the other end thereof is connected to the input-output interface circuit 114, thus controlling the current flowing into the injector 12 and the ignition coil 58.

The control system according to the present invention comprises an EAROM (electrically alterable ROM) 120 in addition to RAM 112 and ROM 110. The operation of this EAROM 120 will be explained below with reference to FIG. 4.

In the drawing under consideration, the RAM 112 is a memory with respect to which data is capable of being read from and written into freely, in which control data is stored and updated under normal operating conditions. This RAM 112 is coupled with EAROM 120 which is a non-volatile memory. The important control data which must not be erased out of the data stored in the RAM 112 is transferred to this EAROM 120 when power is cut off. When power is restored, the control data transferred to EAROM 120 is again returned to RAM 112.

For the purpose of transferring the data from RAM 112 to EAROM 120 when the source voltage from the power supply 122 is cut off, EAROM 120 is impressed with a write signal from a mono-stable multivibrator 126 in response to the turning off of the power switch 124. Specifically, when the power switch 124 is turned off, the input voltage of the threshold gate 128 is reduced below the threshold level, thus reversing the output voltage thereof. This reversed output causes the monostable multivibrator 126 to produce a write signal. The mono-stable multivibrator 126 produces a write signal also in the case where the voltage of the power supply 122 is reduced below the threshold level of the threshold gate 128 for some reason or other even when the switch 124 is on. This threshold level is desirably selected at a minimum voltage where the source voltage adequately secures the operation of the RAM 112.

On the other hand, RAM 112 is impressed with a read signal from the mono-stable multivibrator 130 in response to the turning on of the switch 124, so that the data transferred to EAROM 120 is returned to RAM 112. In other words, when the switch 124 is turned on, the input voltage to the threshold gate 132 is increased beyond the threshold level thereof, with the result that the output thereof is reversed while at the same time causing the mono-stable multivibrator 130 to issue a read signal.

Figure 5:
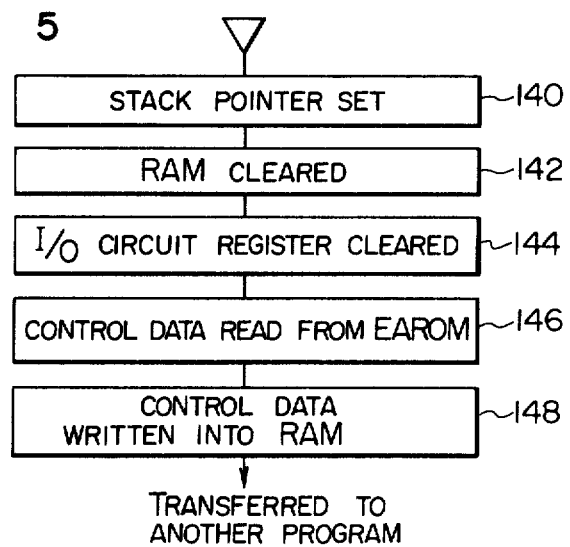
FIG. 5 is a flowchart showing the initial stage of operation of a control circuit following power-up.

When the power switch 124 is off, on the other hand, the threshold gates 128, 132, monostable multivibrators 126, 130, EAROM 120 and RAM 112 are operated by the power stored in the capacitor 134 previously charged from the power supply 122 through the diode 136. Since power consumption of these circuit elements is very small, a capacitor 134 of comparatively large capacitance is sufficient for operation of the circuit elements without any adverse effect. When the power switch 124 is on, the stack pointer is set in the control circuit 70 at step 140 as shown in FIG. 5. This setting of the stack pointer is to designate the address of RAM for transferring thereto the data in the registers for storing the program for CPU 108. The data in RAM 112 is cleared at the next step 142, and the condition in the input-output interface 114 is entirely cleared at step 144. At step 146, the control data stored in EAROM 120 is read, and at step 148, the particular control data is written into RAM 112. This control data is a correction factor for the air-fuel ratio according to an embodiment of the present invention and will be described in detail later.

Figure 6:
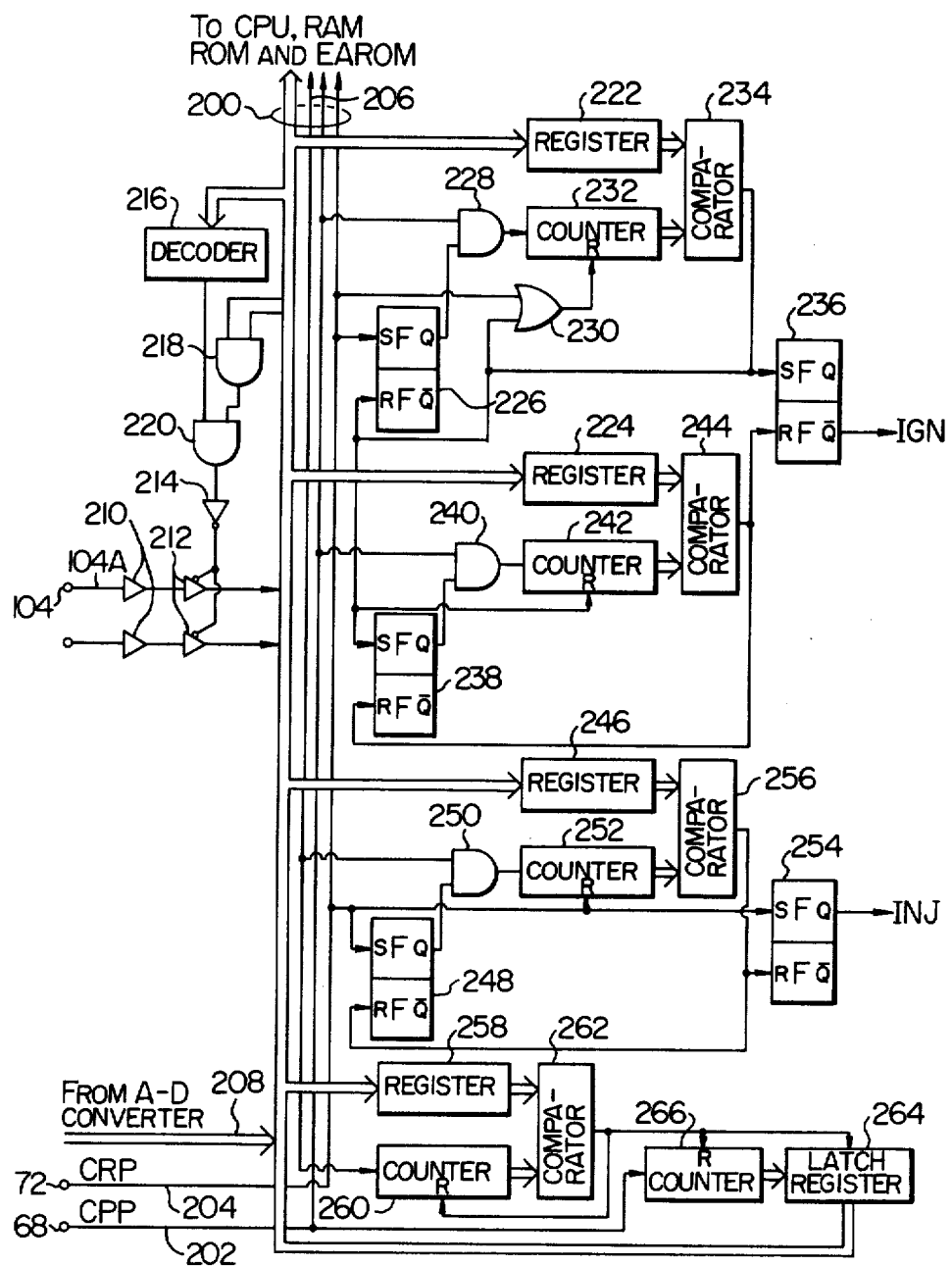
FIG. 6 is a block diagram showing in detail an input-output interface circuit 114 in FIG. 3.

A block diagram showing in detail the input-output interface circuit 114 of FIG. 3 is illustrated in FIG. 6. In this drawing, a bus 200 includes an address bus, a data bus and a control bus connected to the CPU 108, ROM 110, RAM 112 and EAROM 120. The bus 200 includes a line 202 for passing the position pulse CPP from the crank position sensor 68, a line 204 for passing the crank angle pulse CRP from the crank angle sensor 72 and a line 206 for passing a clock pulse from CPU 104. The output of the A-D converter 102 is connected via the bus 208 to the bus 200. The signal 104A from the switch 104 is amplified by the amplifiers 210 and introduced to the bus 200 through tristate drivers 212. When the output of the inverter 214 is low, the input and output of the tristate drivers 212 are connected, while when the output of the inverter 214 is high, the inputs and outputs of the traistate drivers 212 are cut off from each other. The address decoder 216 is for decoding the data in the address bus of the bus 200 and the output thereof becomes high upon receipt of a command to read the data passing through the tristate drivers 212. In timing with this, a read signal is applied to one of the input terminals of the AND gate 218, and a timing pulse is applied to the other input terminal of the AND gate 218 upon completion of preparation for data receipt, thus raising the level thereof to high. At the same time, the output of the AND gate 220 becomes high, and therefore the output of the inverter 214 becomes low, so that the 8-bit data is taken via the tristate drivers 212.

As long as the engine is being driven, data for controlling the ignition timing is read out of the table stored in the ROM 110 in response to the data applied thereto. On the basis of this data read out, the engine control signals $\theta_{IGN}$ and $\theta_{OFF}$ are obtained by a method mentioned later. The procedures for obtaining the signals $\theta_{IGN}$ and $\theta_{OFF}$ are disclosed in Japanese Patent Application No. 17329/79 dated Feb. 19, 1979, which cooresponds to U.S. Application Ser. No. 121,476 dated Feb. 14, 1980 and now U.S. Pat. No. 4,298,941 and will not be described in detail in this specification since they are not the gist of the present invention.

Figure 7:
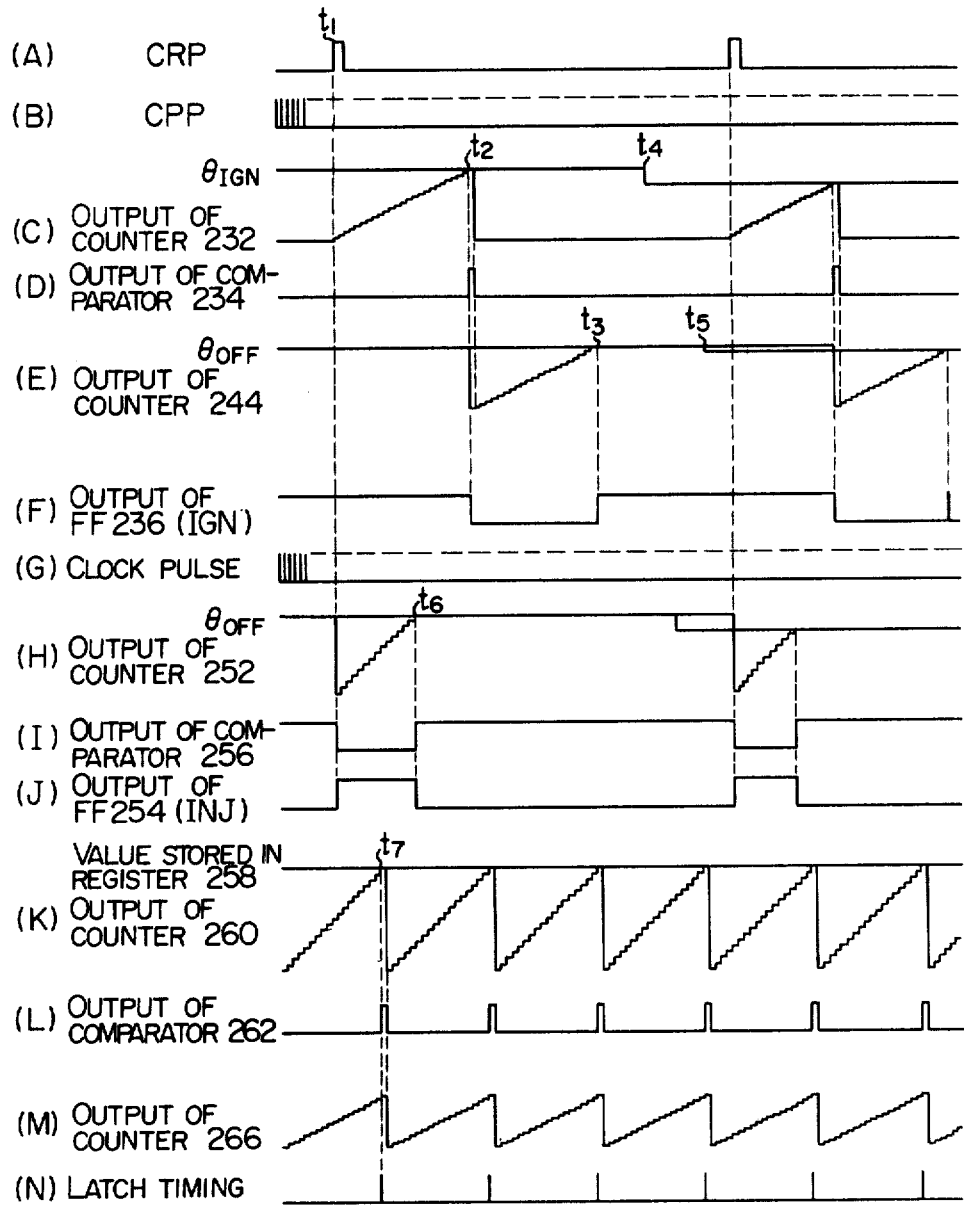
FIG. 7 is a diagram showing signal waveforms produced at the essential parts in FIG. 6.

The signal $\theta_{IGN}$ is stored in the ignition timing setting register 222 through the bus 200 at a predetermined timing, while the signal $\theta_{OFF}$ is stored at a predetermined timing at the register 224 for setting the current cut-off period of the ignition coil. The crank angle pulse CRP of FIG. 7(A) from the line 204 sets the flip-flop 226 at time point $t_1$ to thereby enable the AND gate 228 on the one hand, and resets the counter 232 via the OR gate 230 to thereby reduce the data therein to zero on the other hand. Thus, the position pulse CPP of FIG. 7(B) received from the line 202 is counted at the counter 232 through the AND gate 228, the count thereof being increased with time as shown in FIG. 7(C). The comparator 234 is for comparing the count in the counter 232 with the value $\theta_{IGN}$ stored in the register 222. When the count of the counter 232 coincides with the stored value $\theta_{IGN}$ of the register 222, the output of the comparator 234 rises from a low level to a high level. At this time point $t_2$, the flip-flop 226 is reset, the counter 232 is reset through the OR gate 230 and the flip-flop 236 is reset. As a result, the output of the comparator 234 is a pulse waveform which rises with a slight time delay as shown in FIG. 7(D). This pulse wave further sets the flip-flop 238 at the time point $t_2$, so that the AND gate 240 conducts and the counter 242 is reset. At time point $t_2$, therefore, the counter 242 begins to count the position pulses CPP, and this count value increases with time as shown in FIG. 7(E). The comparator 242 compares the count of the counter 242 with the value $\theta_{OFF}$ stored in the register 224, and when these two values coincide, reverses the output thereof to high level. At this time point $t_3$, the flip-flop 238 is reset, and the AND gate 240 is cut off, thus holding the count of the counter 242. At the same time, the flip-flop 236 is set. As a result, the flip-flop 236 produces a pulse which falls at time point $t_2$ and rises at time point $t_3$ as shown in FIG. 7(F). This output pulse is applied to the ignition coil drive circuit 158, so that current is supplied to the ignition coil as long as this pulse has a high level. This means that the ignition is effected at the fall time $t_2$ thereof.

The control signals $\theta_{IGN}$ and $\theta_{OFF}$ stored in the registers 222 and 224 are updated to suit the engine operating condition at the time points $t_4$ and $t_5$ distant from the rise time points $t_2$ and $t_3$ of the outputs of the comparators 234 and 244 respectively. Similar operations are repeated.

The data Ti indicating the fuel injection period is stored in the register 246 through the bus 200 at predetermined timing. The crank angle pulse CRP from the line 204 sets the flip-flop 248 at time point $t_1$ to thereby enable the AND gate 250 on the one hand and resets the counter 252 to thereby reduce the data therein to zero on the other hand, while at the same time setting the flip-flop 254. Thus the clock pulse shown in FIG. 7(G) is supplied to the counter 252 through the AND gate 250 from the line 206 at time point $t_1$. The count of the counter 252 increases from time point $t_1$ as shown in FIG. 7(H). The comparator 256 compares the count in the counter 252 with the data in the register 246 and produces an output of a high level as shown in FIG. 7(I) when they coincide. At this time point $t_6$, the flip-flops 248 and 254 are reset, the AND gate 250 is disabled, the count of the counter 252 is held, and the output of the flip-flop 254 takes the form of a pulse which rises at time point $t_1$ and falls at the time point $t_6$ as shown in FIG. 7(J). This pulse is applied to the drive circuit of the injector 12 as an injection signal INJ, thus injecting the fuel during the high-level period thereof.

Next, a circuit for detecting the engine revolutional speed will be described. In view of the fact that the engine revolutional speed can be determined from the position pulses CPP counted within a predetermined period of time, a time period for which the position pulses CPP are to be counted is set in the register 258 via the bus 200. The counter 260 counts the clock pulses from the line 206 all the time. When this count coincides with the data in the register 258 at time point $t_7$, the output of the comparator 262 is raised to a high level and the counter 260 is reset. Thus, the count of the counter 260 changes in a saw-tooth form as shown in FIG. 7(K), and the comparator 262 produces a pulse as shown in FIG. 7(L). The period of this pulse corresponds to the time set in the register 258. This pulse sets the data of the counter 266 in a latch register at the rise point thereof, and resets the counter 266 at the fall point thereof. The counter 266 counts the position pulses CPP all the time and is reset periodically by the pulse (L) from the comparator 262, thus producing a count value in saw-tooth form as shown in FIG. 7(M). The maximum value of this count, namely, the count of the position pulses within the time period set in the register 258 is transferred to the latch register 264 at the timing shown in FIG. 7(N) and then supplied through the bus 200 to CPU 108 where it is processed to determine the engine revolutional speed.

In the above-mentioned construction, the control of the amount of fuel injection will be explained below with reference to the flowchart of FIG. 8.

The program for executing the steps of this flowchart is stored in ROM 110. The table used for execution of the program is stored in RAM 112 and adapted to be rewritten appropriately in accordance with the change in the engine control system with time. This table is transferred to EAROM 120 upon the power switch 124 being turned off or when the source voltage drops abnormally. In the program shown in FIG. 8, the air-fuel ratio of the mixture gas taken into the engine is controlled by reference to the stoichiometric air-fuel ratio detected by the exhaust gas sensor 80 under normal operating conditions. This air-fuel ratio under normal operating conditions is stored, and the air-fuel ratio under special operating conditions is corrected on the basis of this stored data, thus properly controlling the air-fuel ratio under special operating conditions.

The air-fuel ratio of the internal combustion engine is given as:

$$R \propto \frac{QA}{nT_i} \quad (1)$$

where QA is a signal representing the amount of drawn in air detected by the air flow sensor 14 in FIG. 1, n the number of engine revolutions determined by dividing the pulses obtained from the angle sensor 98, and Ti the injection pulse width corresponding to the open time of the injection valve of the fuel injector 66. From equation (1), the injection pulse width Ti is expressed as:

$$Ti \propto \frac{QA}{nR} \quad (2)$$

Under the normal operating condition of the internal combustion engine, the injection pulse width Ti is subjected to closed-loop control on the basis of the amount of air QA drawn in and number of revolutions n in such a manner that the theoretical air-fuel ratio Ro is attained, utilizing the fact that the output of the sensor 80 suddenly changes in the neighborhood of the theoretical air-fuel ratio. The drawn in air amount QA is divided into five ranges from zero to maximum. The number of ranges into which QA is divided may alternatively be eight or more, as desired. The value of the right side Ro for a brand new vehicle which has not yet been driven after being manufactured in the factory is expressed as:

$$Ro = \frac{QA}{nT_i} \quad (3)$$

The values QA, n and Ti change with time. The value Rti of the right side of equation (1) after such a change with time is given as:

$$Rti = \frac{QA}{nT_i} \quad (4)$$

The ratio Ki (i=1, 2, 3, 4 or 5) between Rti and Ro for each range of the drawn in air amount is:

$$Ki = \frac{Rti}{Ro} \quad (5)$$

For a brand new vehicle, Rti=Ro, and therefore Ki=1. The value Ki is a correction factor for the change with time of the performance of the heating element 24 and injector 12.

Figure 8:
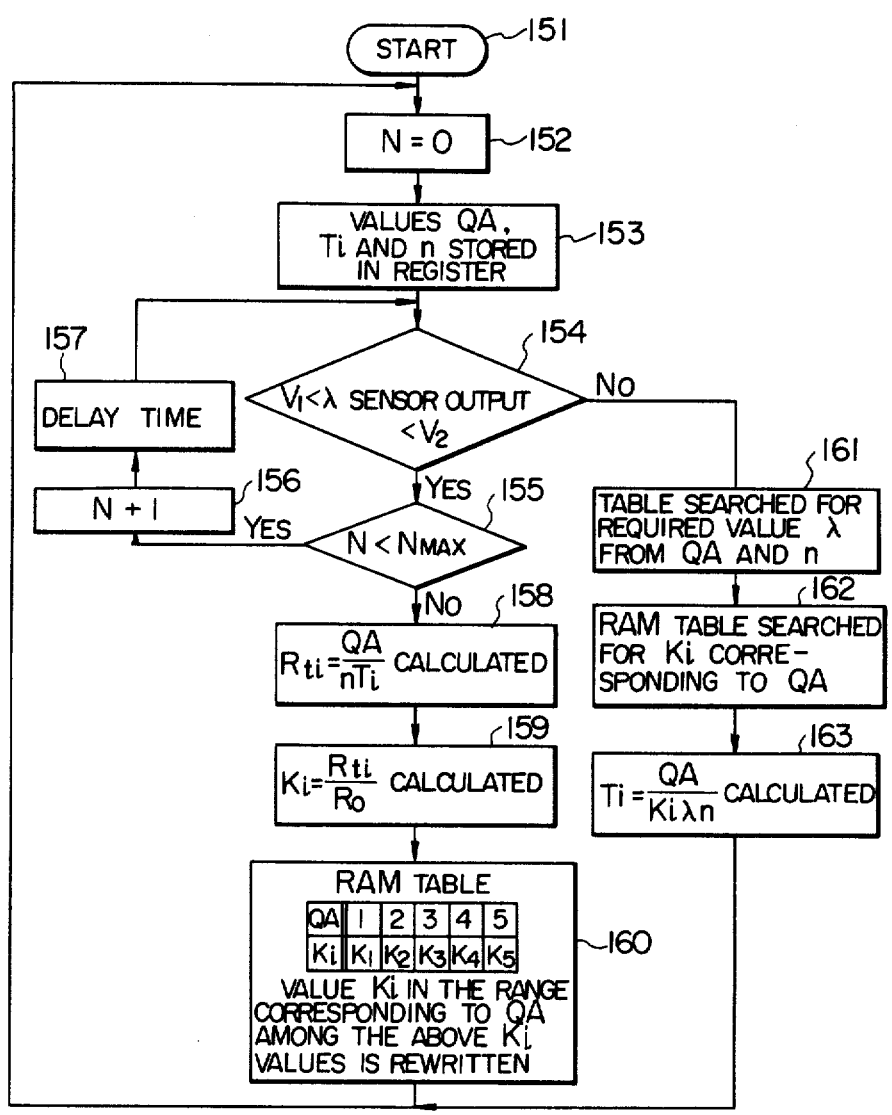
FIG. 8 is a flowchart for explaining an engine control according to the present invention.

A flow chart for explaining the operation of an embodiment of the present invention is shown in FIG. 8. The step 151 of FIG. 8 is concerned with a brand new vehicle in the initial state having not yet been driven. Under this condition, "1" is written in the memory sections $K_1$, $K_2$, $K_3$, $K_4$ and $K_5$ of the non-volatile memory RAM 112. At the same time, the value Ro is calculated by CPU 108 according to the program of ROM 110 and stored in RAM 112. In step 152, the continuous number N stored in RAM 112 is set to "0".

The mixture gas of a certain air-fuel ratio comprised of drawn in air and the fuel injected from the fuel injector 12 is ignited in the cylinder 8 and discharged into the exhaust gas tube 10. It requires approximately 100 msec on the average for the air at the injector 12 to reach the λ sensor 80. If normal operation continues during this period, the air-fuel ratio at the position of the injector 12 is considered identical to that before combustion of the exhaust gas at the position of the λ sensor 80. This air-fuel ratio is the theoretical one based on the output of the λ sensor 80. If the normal operation condition is changed to a special operating condition or a special operating condition continues during the 100-msec period, on the other hand, the output of the λ sensor 80 indicates a value different from the theoretical air-fuel ratio and therefore the air-fuel ratio of the mixture gas at the position of the injector 12 is not the theoretical value.

Step 153 in FIG. 8 is such that the number of revolutions n, the injection pulse width and the amount QA of air drawn in for N=0 are stored in the corresponding memory sections of the register. In step 154, whether the engine is in the normal operating condition or not is determined. Under the normal operating condition, the output of the λ sensor changes suddenly in the neighbourhood of the theoretical air-fuel ratio. When it is determined that the output of the λ sensor is within the range $V_1$ to $V_2$ corresponding to the theoretical air-fuel ratio, the engine is considered to be operating in the normal operating condition and advance is made to the next step 155.

It takes about 100 msec for the gas to proceed from the injection position of the injector 12 to the λ sensor 80. After confirming that the normal operating condition continues for at least 100 msec, the values QA, Ti and n stored in step 153 may be processed as values giving the theoretical air-fuel ratio subjected to closed loop control. Assume that the continuous number N has the maximum value Nmax of 10. If 10 msec is set for one continuous number N, it takes 100 msec before N reaches 10. If the number is made proportional to the flow velocity in synchronism with engine rotation instead of being fixed, a more accurate control is possible. In step 155 in FIG. 8, whether or not the continuous number N has been reached is determined. If N is smaller than Nmax, "1" is added to N in step 156 and a delay time to attain 10 msec for one continuous number N is given in step 157, from which the process is returned to step 154. After that, a similar process from steps 154 to 157 is repeated. When N reaches Nmax in step 155, an advance is made to step 158 where the values QA, Ti and n stored in the register in step 153 are read out and the value Rti of equation (4) is calculated according to the program stored in ROM 110. In step 159, the value Ro is read out of the RAM 112 and value Ki is calculated according to equation (5). This value Ki is rewritten as the correction factor Ki for the range corresponding to the drawn in air amount in step 160. The process is then returned to step 152 for repetition of a similar operation. In one operation from steps 152 to 160, the correction factor for only one of the five ranges of the drawn in air amount is rewritten. Although the performance of the heating element 24 or injector 12 changes with time on the order of day or month, the correction factor table for the nonvolatile RAM 112 is rewritten at time intervals on the order of seconds. Thus the table is rewritten sufficiently prior to the change with time of such devices. Instead of air amount QA of drawn in air, the negative pressure VC of the negative pressure sensor 25 may be used with equal effect.

If "No" is the answer at step 154, the engine is in a special operating condition, under which the air-fuel ratio is controlled at a value different from the theoretical ratio. In warm-up, acceleration or driving up a slope, for example, the air-fuel ratio is reduced below the theoretical value; while in deceleration or driving down a slope, the air-fuel ratio is controlled at a larger value than the theoretical one. The 256 values (16×16) of air-fuel ratio λ corresponding to the number of revolutions n and the sucked air amount divided into 16 ranges are tabulated and stored in ROM 110. Under a special operating condition, the air-fuel ratio λ suitable for that operation is retrieved from the table of ROM 110 and the injection pulse width Ti based on the air-fuel ratio λ is determined from the equation below:

$$Ti = \frac{QA}{\lambda n} \quad (6)$$

thus setting the injection time Ti. It should be noted that the value λ for the conventional systems is already set at the time of assembly of ROM 110 and therefore not corrected for any change with time of the sensors or other operating devices and that in the conventional systems, the air-fuel ratio is not controlled on the basis of the λ sensor 80 under the special operating conditions where the system is subjected to open-loop control. According to this embodiment, in spite of the open-loop control under the special operating conditions, the injection pulse width Ti is calculated from the equation (7) below:

$$T_1 = \frac{QA}{Ki\lambda n} \qquad (7)$$

taking into consideration the correction factor Ki for the air-fuel ratio. It is thus possible to drive the vehicle under the special operating conditions at the air-fuel ratio intended in design stage, which has been corrected against the change with time of the performance of the heating element 24 and injector 12.

In other words, step 161 is one in which the air-fuel ratio associated with the special operating condition at the particular time is retrieved from the table of ROM 110 on the basis of the values of amount QA of air drawn in and number of revolutions n. This is followed by step 162 in which the correction factor Ki for the air-fuel ratio associated with the amount QA of air drawn in is retrieved from the nonvolatile memory section of RAM 112. In step 163, the injection pulse width Ti is calculated by CPU 108 from equation (7) according to the program stored in ROM 110, and the air-fuel ratio is controlled by an open loop on the basis of the calculated value. For a special operating condition, the process is repeated by the loop including the steps 152, 153, 154, 161, 162, 163 and 152 processed in that order.

The value K is sufficiently approximate to unity or 1 in the well-adjusted air flow sensor or negative pressure sensor. For a sensor low in accuracy, however, the value K is distributed around unity. Also, the value K is corrected with time as required. This value K is read out in step 163 for correction of QA or (VC), and therefore a high accuracy is always assured for any sensor. Also, under the special operating conditions, the value of the air-fuel ratio λ read out of the non-volatile table can be set at a corrected air-fuel ratio, and therefore the accuracy thereof remains unchanged with sensor variations. Further, under the special operating conditions, an open loop control is effected thus eliminating the problem of transient delay which is a disadvantage of the feed back control.

The foregoing concerns the operation of RAM 112. The data stored in RAM 112, especially, the tables $K_1$ to $K_5$ within RAM 112 are transferred to EAROM 120 upon the occurrence of a cause of erosure of the data stored therein, such as when the power switch 124 is turned off or the source voltage drops to an abnormally low level in the present embodiment. Upon restoration of the source voltage or the turning on of the power switch 124, the tables thus transferred are again returned to RAM 112 and used for execution of the program mentioned above.

The foregoing description concerns the case in which the necessary data among the data stored in RAM are transferred to EAROM 120 upon the occurrence of a cause which otherwise might erase the data in RAM such as the turning off the voltage applied to RAM or an abnormal drop thereof. According to the present invention, however, the transfer of the data in RAM to EAROM is not limited to such a case. Specifically, such a transfer of the required data in RAM to EAROM may be effected by applying an interruption signal to the program in execution at predetermined intervals of the engine number of revolutions, distance covered or time during the engine driven state. A circuit for performing such an operation is shown in FIG. 9.

Figure 9:
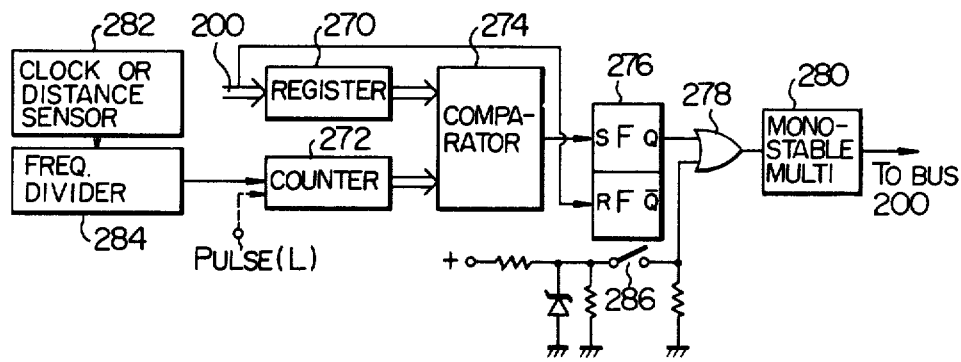
FIG. 9 is a block diagram showing a circuit for generating an interruption signal for transferring the control data from RAM to EAROM.
Figure 10:
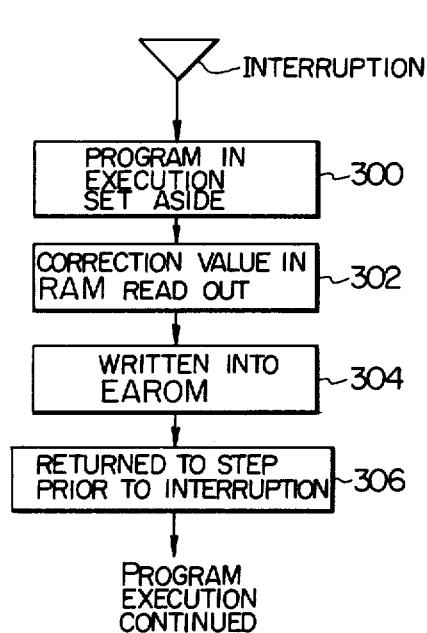
FIG. 10 is a flowchart showing the operation of the control circuit upon generation of the interruption signal from the circuit of FIG. 9.

In FIG. 9, a predetermined value is stored in a register 270 via a bus 200. A counter 222 counts input pulses. A comparator 274 produces a high level signal when the count of the counter 272 coincides with the data in the register 270, thus setting the flip-flop 276. At this point in time, the output of the flip-flop 276 is raised to a high level, and actuates the monostable multivibrator 280 through an OR gate 278, thus producing an interruption signal at the output thereof. This interruption signal is applied via the bus 200 to CPU 108 and transfers temporarily the program in execution to the address set at step 150 in FIG. 5. This action is taken at step 300, followed by the step 302 where the correction value in RAM is read by the register. This data is written in EAROM at step 304. At step 306, the condition before the interruption is restored, thus proceeding with the program.

The counter 272 in FIG. 9 merely counts but is not required to be reset and may be left to be reset by itself when reaching the full count. For an interruption of this input pulse to the counter 272 at predetermined intervals of engine number of revolutions, the output pulse (FIG. 7(L)) of the comparator 262 of the circuit for detecting the engine number of revolutions is used. Also, for an interruption at predetermined intervals of distance covered, the pulse from the distance sensor 282 for detecting the number of revolutions of the motor vehicle wheels is frequency-divided by a frequency divider 284, and the output of the frequency-divider 284 is applied to the counter 272. For an interruption at predetermined intervals of time during the engine driven state, on the other hand, the sensor 282 is replaced by a clock pulse generator which oscillates only during the engine driven state, such as only while the engine key switch is turned on. Also, by providing and manually operating a switch 286, an interruption signal may be generated in the mono-stable multivibrator 280 through the OR gate 278.

Figure 11:
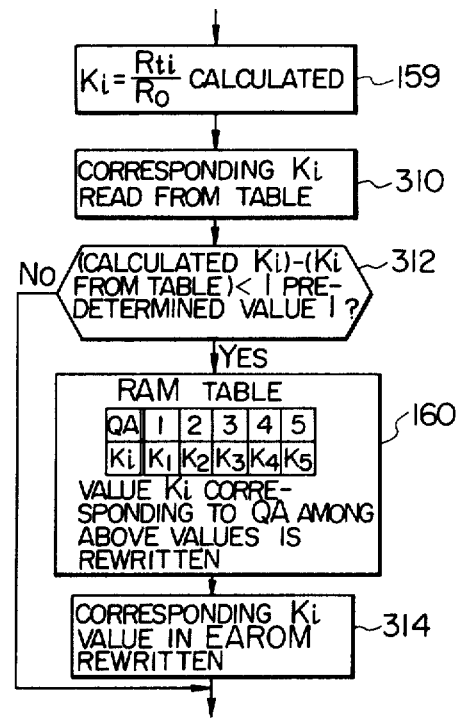
FIG. 11 is a partial flowchart showing a modification of part of the flow in FIG. 8.

The correction factor Ki may be rewritten in the tables at such long time intervals as months or days but not necessarily at such short intervals of seconds as shown in FIG. 8. Also, a slight error of the correction factor Ki does not adversely affect the engine control. Therefore, the steps 158, 159 and 160 in the program shown in FIG. 8 may be modified to those as shown in FIG. 11. Specifically, the value Ki corresponding to the correction factor calculated at step 159 is read out of the RAM at step 310; and the difference between the correction factor Ki calculated at step 159 and the correction factor Ki read out of the table is determined while at the same time determining whether or not the difference is higher than a predetermined value at step 312. This predetermined value is such that the value of the correction factor Ki corresponds to the error allowable for the purpose of engine control. Therefore, the data in a table is rewritten at step 160 only when the difference between the correction factor Ki calculated at step 159 and the correction factor stored in the particular table is found to exceed a predetermined amount at step 312. If it is decided at step 312 that the data in the table is not required to be rewritten, i.e., the answer is "No", transfer is made back to the step 152 in FIG. 8.

After the table in RAM is rewritten at step 160, the corresponding correction factor of EAROM is rewritten at the next step 314. In the case where this step 314 is provided, it is not necessary to transfer the table in the RAM to EAROM upon turning off of the power switch or an abnormal drop of the source voltage or at predetermined intervals of time, at predetermined intervals of number of revolutions or at predetermined intervals of distance covered as explained in FIG. 9.

It will be understood from the foregoing description that according to the present invention the control data stored and updated in a volatile memory are transferred to a non-volatile memory upon the occurrence of a cause which otherwise might erase the particular control data. Therefore, the data required for proper engine control are maintained all the time, thus making possible a reliable engine control. Especially when restarting the engine, the control data last stored in EAROM may be read out and used, thereby improving the reliability of the system.

What is claimed is:

1. In a method for engine control comprising the steps of detecting a plurality of electrical signals representing the engine operating conditons, calculating a correction factor on the basis of said electrical signals and control data stored in a memory, calculating control data for controlling the engine on the basis of said correction factor and at least a selected one of said electrical signals, and controlling the engine on the basis of the control data calculated at said control data calculation step; the improvement further comprising the steps of:
    (a) successively writing the correction factor calculated at said correction factor calculation step into a first volatile memory capable of being written and read;
    (b) successively reading said correction factor out of said first volatile memory in order to calculate said control data;
    (c) successively writing said correction factor into a second non-volatile memory capable of being written and read, at a frequency not higher than the frequency of writing of said correction factor into said first memory; and
    (d) successively reading said correction factor from said second memory and writing said correction factor into said first memory at a frequency lower than the frequency of reading said correction factor out of said first memory.

2. A method for engine control according to claim 1, wherein said step (c) is such that the correction factor stored in said first memory is restored in said second memory when the voltage applied to said first memory is reduced to a predetermined level higher than a level where the storage ability of said first memory is lost.

3. A method for engine control according to claim 2, wherein said step (d) is such that when the voltage applied to said first memory is restored to a normal level capable of holding the storage therein from a level lower than said normal level, said correction factor stored in said second memory is read out and written into said first memory.

4. A method for engine control according to claim 1 or 2, wherein said step (c) further includes the steps of counting a predetermined time during the engine driven state, and storing said correction factor from said memory into said second memory at intervals of said predetermined time.

5. A method for engine control according to claim 1 or 2, wherein said step (c) further includes the steps of detecting that the engine has made a predetermined number of revolutions, and storing the correction data in said first memory into said second memory each time of detection at said detection step.

6. A method for engine control according to claim 1 or 2, wherein said step (c) further includes the steps of detecting that the motor vehicle carrying said engine has covered a predetermined distance, and storing said correction factor in said first memory into said second memory at intervals of said distance detected at said detection step.

7. A method for engine control according to claim 1 or 2, wherein said step (a) further includes the steps of detecting that the difference between the correction factor calculated on the basis of the control data stored in said memory and said electrical signals and the correction factor stored in said first memory is larger than a predetermined value and writing the calculated correction factor into said first memory only when it is detected at said detection step that said difference is larger than said predetermined value.

8. A method for engine control according to claim 7, wherein said step (c) is such that said correction factor is written into said second memory only when it is detected that said difference is larger than said predetermined value.

9. A method for engine control according to claim 1 or 2, wherein said step (c) is manually processed.

10. In an engine control system comprising means for detecting a plurality of electrical signals representing the engine operating conditions, means for calculating a correction factor on the basis of said electrical signals and the control data stored in a memory, and for calculating control data from said correction factor and at least one of said electrical signals, and means for controlling the engine on the basis of said control data; the improvement further comprising a volatile first memory capable of being written and read, the correction factor calculated by said calculation means being written successively into said first memory and read out therefrom for calculating said control data, and a non-volatile second memory capable of being written and read, said correction factor being successively written into said second memory at a frequency not higher than the frequency at which said correction factor is written into said first memory.

11. An engine control system according to claim 10, further comprising means for storing said correction factor in said first memory into said second memory when the voltage supplied to said engine control system is reduced to a predetermined level higher than a level where the storage ability of said first memory is lost.

12. An engine control system according to claim 11, further comprising means for storing said correction factor in said second memory into said first memory when the voltage supplied to said engine control system is restored to a normal level capable of holding the storage from a level lower than said normal level.

13. An engine control system according to claim 10 or 12, further comprising means for generating an interruption signal for storing the correction signal in said first memory into said second memory.

14. An engine control system according to claim 13, wherein said interruption signal generating means includes an oscillator for generating an electrical signal of a predetermined period while a source voltage is applied to said engine control system, means for counting a predetermined length of time on the basis of an electrical signal from said oscillator, and means for generating said interruption signal at intervals of said predetermined length of time counted by said counting means.

15. An engine control system according to claim 13, wherein said interruption signal generating means includes a sensor for detecting the number of revolutions of the wheels of the motor vehicle, means for detecting a predetermined covered distance on the basis of an electrical signal from said sensor, and means for generating said interruption signal at intervals of said predetermined covered distance detected by said detecting means.

16. An engine control system according to claim 13, wherein said interruption signal generating means includes means for detecting the number of engine revolutions, means for detecting the speed of engine revolution on the basis of a signal from said detecting means, and means for generating said interruption signal at intervals of said number of revolutions detected by said number-of-revolutions detecting means.

17. An engine control system according to claim 13, wherein said interruption signal generating means includes switch means manually operated, and means for generating said interruption signal in response to the operation of said switch means.

18. A method of operating a processor-controlled system for controlling an engine in which system control signals are generated in response to processing operations carried out in accordance with data stored in memory, said memory having a first portion capable of rapid read/write access and a second portion having the capability of holding data stored therein or coupled thereto irrespective of the application of operation energy thereto, comprising the steps of:
 (a) storing data to be accessed for engine operation in said first portion of said memory during a first prescribed condition of operation of said system; and
 (b) causing selected data stored in said first portion of said memory to be transferred to said seconds portion of said memory in response to the occurrence of a second prescribed condition of operation of said system corresponding to a prescribed historical state of operation of said system.

19. A method according to claim 18, further comprising the step of:
 (c) selectively causing data stored in said second portion of said memory to be transferred to said first portion of said memory.

20. A method according to claim 18, wherein said second prescribed condition of operation of said system corresponds to one of the conditions of the elapse of a prescribed period of time, the accumulation of a predetermined number of engine revolutions, and the accumulation of a predetermined travel distance of a vehicle propelled by said engine.

21. A method according to claim 18, wherein said first prescribed condition corresponds to the normal operating condition of said engine and wherein step (b) further includes the step of causing said selected data stored in said first portion of said memory to be transferred to said second portion of said memory in response to a prescribed reduction in power below that normally employed for operating said first portion of said memory.

22. A method according to claim 21, further comprising the step of:
 (c) selectively causing data stored in said second portion of said memory to be transferred to said first portion of said memory.

23. A method according to claim 22, wherein said step (c) comprises the step of causing data that has been transferred to said second portion of said memory to be transferred back to said first portion of said memory in response to a restoration in power normally employed for operating said first portion of said memory.

24. A method according to claim 19, wherein step (c) comprises the step of causing data stored in said second portion of said memory to be selectively transferred to said first portion of said memory in accordance with a prescribed data transfer sequence.

25. A method of operating a processor-controlled system in which system control signals are generated in response to processing operations carried out in accordance with data stored in memory, said memory having a first, random access, portion capable of rapid read/write access and a second, electronically alterable read only, portion having the capability of holding data stored therein or coupled thereto irrespective of the application of operational energy thereto, comprising the steps of:
 (a) successively storing data to be accessed for system operation in said first portion of said memory during a first prescribed condition of operation of said system;
 (b) successively causing selected data stored in said first portion of said memory to be transferred to said second portion of said memory in response to the occurrence of a second prescribed condition of operation of said system, the time between successive occurrences of said second prescirbed condition being greater than the time between successive occurrences of said first prescribed condition; and
 (c) reading out data in accordance with which said system control signals are generated exclusively from said first portion of said memory.

26. A method according to claim 25, further comprising the step of:
 (c) selectively causing data stored in said second portion of said memory to be transferred to said first portion of said memory.

27. A method according to claim 25, wherein said second prescribed condition corresponds to a prescribed reduction in operational energy below that normally employed for operating said first portion of said memory.

28. A method according to claim 27, further comprising the step of:
 (c) selectively causing data stored in said second portion of said memory to be transferred to said first portion of said memory.

29. A method according to claim 28, wherein step (c) comprises the step of causing data that has been transferred from said first portion of said memory to said second portion of said memory to be transferred back to said first portion of said memory in response to a restoration in the operational energy normally employed for operating said first portion of said memory.

30. For use in a processor-controlled system in which system control signals are generated in response to processing operations carried out in accordance with predetermined information, an information storage and retrieval system comprising:
 memory means having a first, random access, portion capable of rapid read/write access and a second, electronically alterable read only, portion having the capability of holding information stored therein or coupled thereto irrespective of the application of operational energy thereto; and means, coupled to said memory, for causing information to be stored in said first portion of said memory during a first prescribed condition of operation of said system, and for causing selected information stored in said first portion of said memory to be transferred to said second portion of said memory in response to the occurrence of a second prescribed condition of operation of said system corresponding to a prescribed historical state of operation of said system.

31. An information storage retrieval system according to claim 30, wherein said means further comprises means for selectively causing information stored in said second portion of said memory to be transferred to said first portion of said memory.

32. The information storage retrieval system according to claim 30, wherein said first prescribed condition corresponds to the normal operating condition of said system and wherein said means further includes means for causing said selected information stored in said first portion of said memory to be transferred to said second portion of said memory in response to a prescribed reduction in operational energy below that normally employed for operating said first portion of said memory.

33. The information storage retrieval system according to claim 37, wherein said means further comprises means for selectively causing information stored in said second portion of said memory to be transferred to said first portion of said memory.

34. The information storage retrieval system according to claim 33, wherein said means comprises means for causing information that has been transferred from said first portion of said memory to said second portion of said memory to be transferred back to said first portion of said memory in response to a restoration in the operational energy normally employed for operating said first portion of said memory.

35. The information storage retrieval system according to claim 30, wherein said system comprises a system for controlling the operation of an engine and wherein said second prescribed condition of operation corresponds to one of the conditions of the elapse of a prescribed period of time, the accumulation of a predetermined number of engine revolutions, and the accumulation of a predetermined travel distance of a vehicle propelled by said engine.

* * * * *